United States Patent
Janakiraman et al.

(10) Patent No.: US 7,403,914 B2
(45) Date of Patent: Jul. 22, 2008

(54) CLIENT-SERVER METHODS FOR DYNAMIC CONTENT CONFIGURATION FOR MICROBROWSERS

(75) Inventors: Janani Janakiraman, Austin, TX (US); Rabindranath Dutta, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 11/057,270

(22) Filed: Feb. 11, 2005

(65) Prior Publication Data

US 2005/0197924 A1 Sep. 8, 2005

Related U.S. Application Data

(62) Division of application No. 09/944,518, filed on Aug. 31, 2001.

(51) Int. Cl.
*G06Q 30/00* (2006.01)

(52) U.S. Cl. .................. 705/26; 709/224; 709/227; 707/10; 235/472.01; 370/311; 455/67.11

(58) Field of Classification Search .............. 705/26, 705/27; 709/217, 224; 370/311, 329; 455/67.11; 707/10; 235/472.01
See application file for complete search history.

(56) References Cited

U.S. PATENT DOCUMENTS

| 6,089,456 | A | * | 7/2000 | Walsh et al. ............ 235/472.01 |
| 6,108,316 | A | * | 8/2000 | Agrawal et al. ............. 370/311 |
| 6,138,155 | A | * | 10/2000 | Davis et al. ................. 709/224 |
| 6,493,758 | B1 | * | 12/2002 | McLain ....................... 709/227 |
| 6,745,011 | B1 | * | 6/2004 | Hendrickson et al. .... 455/67.11 |
| 2002/0059367 | A1 | | 5/2002 | Romero et al. |
| 2006/0271562 | A1 | * | 11/2006 | Kato ........................... 707/10 |

* cited by examiner

*Primary Examiner*—Yogesh C. Garg
(74) *Attorney, Agent, or Firm*—Robert H. Frantz; Jeffrey S. LaBaw

(57) ABSTRACT

A microbrowser such as web-enabled wireless telephones and personal digital assistants allows a user to configure types of objects to be blocked from download including object memory consumption, display area, download time, and restrictions on animated images and executable scripts. Microbrowser state conditions such as battery level and network connection mode are considered when providing said limitations such that more restrictions may be placed during low battery periods to maximize battery life. For example, during low battery conditions or analog connection mode, a user may configure an enhanced microbrowser not to download advertisements, run scripts or animated objects in order to maximize remaining battery life. In another example, a user may configure an enhanced microbrowser to block the download of objects containing audio, or which will occupy more than a certain percentage of the available display area.

8 Claims, 5 Drawing Sheets

CLIENT-SERVER METHODS FOR DYNAMIC CONTENT CONFIGURATION FOR MICROBROWSERS

CROSS REFERENCE TO RELATED APPLICATIONS (CLAIMING BENEFIT UNDER 35 U.S.C. 120)

This is a divisional application of U.S. patent application Ser. No. 09/944,518, filed on Aug. 31, 2001, by Janani Janakiraman, et al.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

Related U.S. patent application Ser. No. 09/944,518, filed on Aug. 31, 2001, by Janani Janakiraman, et al., is hereby incorporated by reference in its entirety including figures.

BACKGROUND OF THE INVENTION

1. Field of the Invention

The present patent application is a divisional application of U.S. patent application Ser. No. 09/944,518, filed on Aug. 31, 2001, by Janani Janakiraman, et al. This invention relates to the art of dynamic configuration of server content for delivery to a client or terminal device, such as a WAP-enabled telephone or personal digital assistant, over a computer network, such as the Internet. The invention relates especially to the arts of automatically grooming or tailoring the content delivered to a microbrowser having limited resources and capabilities such that only content preferred by the user or compatible with the microbrowser is delivered.

2. Description of the Related Art

The proliferation of e-commerce on the World Wide Web (WWW) has offered immense potential for revenue generation through advertisements. The web offers unprecedented opportunities for personalized advertisements, and there has been stunning innovations in customized advertising over the last few years.

Additionally, the "web-enablement" of various handheld terminals including wireless telephones ("cell phones" and PCS phones) as well as wiresless-networked personal digital assistants (PDA) have added to the array of potential "browsing" devices which may interact with a web server and its content. The number of users of such devices is steadily increasing, so the demand for web site content which is targeted for these devices is also expected to continue to grow.

Turning to FIG. 1, the well-known arrangement of client browser computers (1), web servers (5) and Advertising servers ("Ad Server") (6) are shown. The client browser computer (1) typically is equipped with software such as a web browser and a communications protocol stack such that it may connect to and communicate via the World Wide Web (3). Client browser computers include conventional personal computers such as IBM-compatible personal computers and Apple iMac [TM] computers.

Other "microbrowser" devices (9), such as web-enabled wireless telephones and PDAs, WebTV terminals and Internet appliances, may also access information from the Web Server (5) and Ad Server (6).

A web server (5) is usually provided with one or more data files of web page content such that they may be delivered to a client browser computer upon request, such as by hypertext transfer protocol (HTTP). The web server is also communicably connected to the World Wide Web (3) or another suitable computer network. IBM's WebSphere [TM] enterprise server software combined with a suitable networking computing platform, such as a personal computer running IBM's AIX [TM] operating system, is an example of one such web server (5).

The microbrowser devices (9), though, typically have lower performance and considerable resource restrictions when compared to computer browsers (1), including much less memory, much smaller display area (and fewer colors in many cases), much slower microprocessor, as well as considerably slow transmission rate between the network (3) and the devices (8, 2).

For example, a Web Server may easily deliver a component to a web page over a dial-up modem connection or cable modem (2) from a standard web browser (1) on a personal computer having a 750 MHz processor, 128 MByte or more of memory, a full 1024 by 768 pixel, 24-bit color palette display over a 56 kbit/sec or higher data link using a common protocol such as Hyper Text Transfer Protocol (HTTP). The web pages themselves may be encoded in Hyper Text Markup Language (HTML).

By contrast, the microbrowser device may only have a 100 MHz processor, 32 MByte of memory, a data link of a few kilobits per second, and may run a protocol such as Wireless Application Protocol (WAP) or i-Mode. Due to these restrictions in resources, often on the scale of one-tenth the capabilities of a standard web browser, the special protocols (WAP, i-Mode, etc.) have been developed to minimize the number of communication messages or "handshakes" which occur during a web page access. This supports effective use over the lower communications bandwidth typically available to such devices, as well as reduces the resource requirements (processing bandwidth, memory, etc.) needed on the devices to some degree.

WAP and protocols like it are intended for use by devices such as handheld digital wireless mobile phones, pagers, two-way radios, "smartphones" and communicators, although it could be applied to "higher end" devices such as personal computer or laptop computer-based web browsers. WAP itself is defined to be interoperable with most wireless networks, including cellular digital packet data (CDPD), code-division multiple access (CDMA), global system for mobile communications (GSM), time division multiple access (TDMA), and many others. These protocols are generally operating-system independent or can be used with a wide variety of operating systems which are common in such devices, including PalmOS, EPOC, Windows CE, FLEXOS, OS/9, JavaOS, and others.

To further enhance the "wireless" web browsing experience, many web servers and advertising ("ad") servers maintain two separate sets of content: a "normal" set in HTML for normal browsers, and an "optimized" set in Wireless Markup Language (WML) for wireless browsers. HTML, HTTP, WML, WAP and i-Mode are well known in the art.

Some web pages include advertisements, such as banner ads, which include information for a user to view regarding products or services being promoted by the sponsors of the web server or web page being viewed. Many online businesses including search engines, travel services, news services, etc., have become dependent on generation of revenue through advertising as many of these companies offer their "services" at not cost to the web "visitor".

These "ads" are typically delivered by an Ad Server (6), which is also connected to the Internet or World Wide Web (3). In FIG. 2, the well-known process of merging ads (23) and web page contents (24) to be displayed on a portion of a client display (20) in a web browser frame (21) is shown.

The web browser frame (21) typically includes a set of navigation controls (22) such as Back and Forward buttons, as well as a Universal Resource Locator (URL) address selector. Displayed in the display frame of the web browser is the selected ("pointed to") web page content (24), which is retrieved (26) from the web server (5) using a protocol such as HTTP.

An ad (23) located on the page is delivered typically from a separate server such as and Ad Server (6), through a common web page inclusion method in the code for the page content, such as a direct hyperlink (25) to the advertising object on the ad server (5), or through an Hyper Text Markup Language (HTML) "include" statement. These ad objects are typically graphic image files, such as Graphic Interchange Format (GIF) or Joint Photographic Experts Group (JPEG), additional web page code such as HTML, or even audio or video clips such as "WAV" or "AVI" files.

The web browser software first retrieves a base web page from the web server, and then retrieves all the data items or objects which are referred to in the web page code, such as a graphic image or additional sections of HTML. Thus, what is displayed to the user after retrieving all of the referred to objects, is a combination of all the items included in the web page source code.

As processing capabilities, memory storage availability, and communications bandwidth are severely limited when serving a microbrowser, may web server or web site operators choose to only offer a subset in WML of their full "normal" content, in order to minimize upkeep and maintenance costs of the special WML content.

However, this may still produce an undesirable wireless web browsing experience for a microbrowser user. For example, a search engine web site may decide that, due to commercial considerations, they will include a set of banner ads in their WML content. This, then, takes time to download to the microbrowser, consumer processing bandwidth and memory, and consumes valuable display area on the microbrowser. As the commercial paradigm is different in wireless web browsing (connection time is usually charged by the minute rather than a flat-rate per month in regular web browsing), an ad which takes a long time to download will cause a negative consumer reaction as it uses his or her "minutes" and results in increased cost for services for the user.

Also consider that most of these types of microbrowsers are battery-driven in order to provide mobility to the user. As each of these advertisements are downloaded, displayed and/or animated, they incrementally increase battery energy consumption through increased processor and resource (display, memory) usage. This, too, will cause a negative consumer reaction because they are aware that time "wasted" downloading and displaying such adds eventually results in an earlier "battery low" warning.

As such, the current technology allows the proprietor of a web site to customize the web site content to optimize performance for browsing by a microbrowser, but the user is left with no control or method for selecting which web content objects to download or to omit from a delivered page in order to minimize download times (and connection costs), to maximize display usefulness, and to maximize battery life.

There are methods in the art for "content negotiation", which are well known and which could possibly be applied to this problem. However, these methods generally include more messages or "handshakes" (e.g., client-server interaction steps) to negotiate which content is available and which content to deliver, making the protocol even more resource-intensive than a nonnegotiable protocol. For example, the Internet Engineering Task Force's (IETF) 1998 Request for Comments number 2295 (RFC2295) proposes a process wherein multiple "variants" of content are stored on a server, and a list of available variants and their characteristics is delivered the client or browser device. The client or browser device may then select which variant to download. Not only does this increase the number of messages sent back and forth to communicate the list and to select the variants, it increases substantially the operating burden of the web site to include maintenance, testing, etc., of all the variants. Another IETF Request for Comments, RFC 2703, acknowledges the need for a protocol-independent content negotiation technology, but merely provides and framework of problems to be solved and does not provide a solution to the problem.

So, to employ content negotiation method to a protocol such as WAP would necessarily increase the resource requirements (processing power, communications bandwidth, memory consumption) above and beyond the requirements of the current WAP protocol. As the current WAP protocol is of marginal performance in some situations already, a proposal to increase its resource requirements to add performance negotiability would not be well-received in the industry.

Some available products for browsers allow a user to configure a "shield" from advertising objects, such as Norton's Internet Security software package. These software products typically run in the "background" on a personal computer, examining all data objects being received by the browser software. Any objects which appear to be "user deselected" object types are not fully downloaded, and are not displayed. These types of products, though, due to their very nature of their operation, require significant "extra" processor bandwidth and memory so that their "background" operation does not noticeably depreciate the performance of the normal web browser, and as such, are not suitable for use on a microbrowser.

Therefore, there is a need in the art for a system and method to allow a user to control or select which web objects are downloaded to a microbrowser without adding significant resource requirements to the microbrowser's execution or use, including it's display area, processing bandwidth, communications bandwidth, and memory consumption.

Additionally, there is a need in the art for this system and method to be easily deployable throughout an existing network to avoid the difficult or expensive retrofitting of microbrowser devices with special hardware or software.

Further, there is a need in the art for this system and method to be compatible with other technologies already present in the wireless web environment, including protocols (WAP, i-Mode, etc.) and object formats (WML, HTML, etc.).

BRIEF DESCRIPTION OF THE DRAWINGS

The following detailed description, when taken in conjunction with the figures presented herein, provides a complete disclosure of the invention.

SUMMARY OF THE INVENTION

The present invention offers several improvements in the art of delivering electronic content such as advertisements for consumption, e.g., viewing and/or hearing, by a user on a microbrowser by allowing the user to configure which types of objects are not to be downloaded to by the microbrowser, including parameters and characteristics such as memory consumption, display area consumption, communications bandwidth consumption, battery conditions and other state characteristics of the microbrowser.

For example, during low battery conditions, a user may configure an enhanced microbrowser not to download advertisements, run scripts or animated objects in order to maximize remaining battery life. In another example, a user may configure an enhanced microbrowser to block the download of objects containing audio, or which will occupy more than a certain percentage of the available display area.

DETAILED DESCRIPTION OF THE INVENTION

According to the preferred embodiment, the present invention is realized as software processes executed on or by advertisement servers such as an IBM WebSphere [TM] e-commerce platform, running on a common web server computer such as a personal computer or and IBM AS/400 computer system. The IBM WebSphere [TM] product is available for many operating systems such as Linux, IBM's AIX [TM], or Microsoft Windows NT. However, it will be recognized by those skilled in the art that alternate e-commerce software suites and computer platforms may be adopted without departing from the spirit and scope of the present invention.

A portion of the invention may also be realized as code executable by a microbrowser device, such as inline code modifications to an existing microbrowser firmware package or a downloadable script or plug-in for such a microbrowser, compatible with popular operating systems for such devices including PalmOS, EPOC, Windows CE, FLEXOS, OS/9, JavaOS, and others.

As such, the remainder of this disclosure focuses on the logical processes to be implemented in software on a web server, ad server, and microbrowser.

Figure 1:
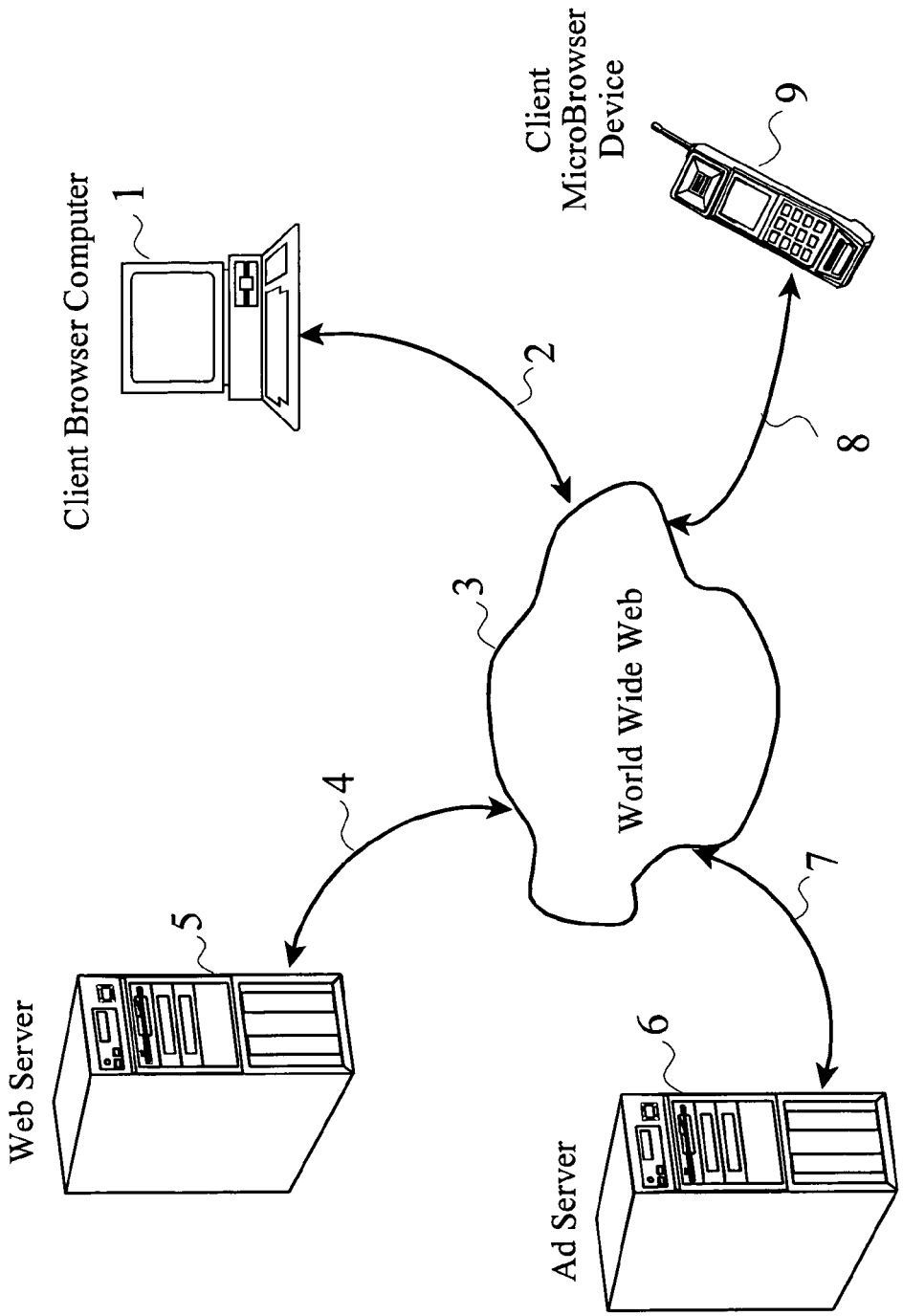
FIG. 1 illustrates the well-known arrangement of ad servers, web servers, microbrowsers and client browser computers interconnected by the World Wide Web or similar computer network.
Figure 2:
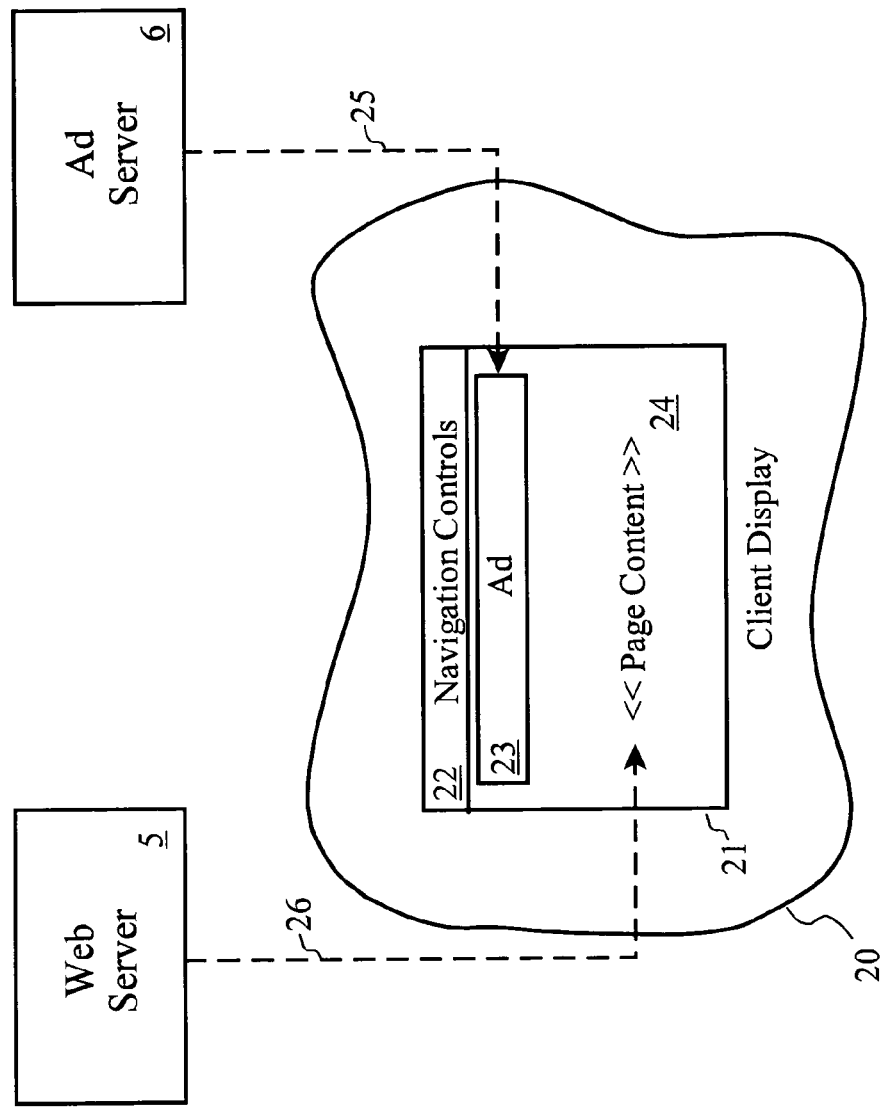
FIG. 2 illustrates the well-known process of delivering electronic advertisements and web page contents to a client web browser computer.
Figure 3:
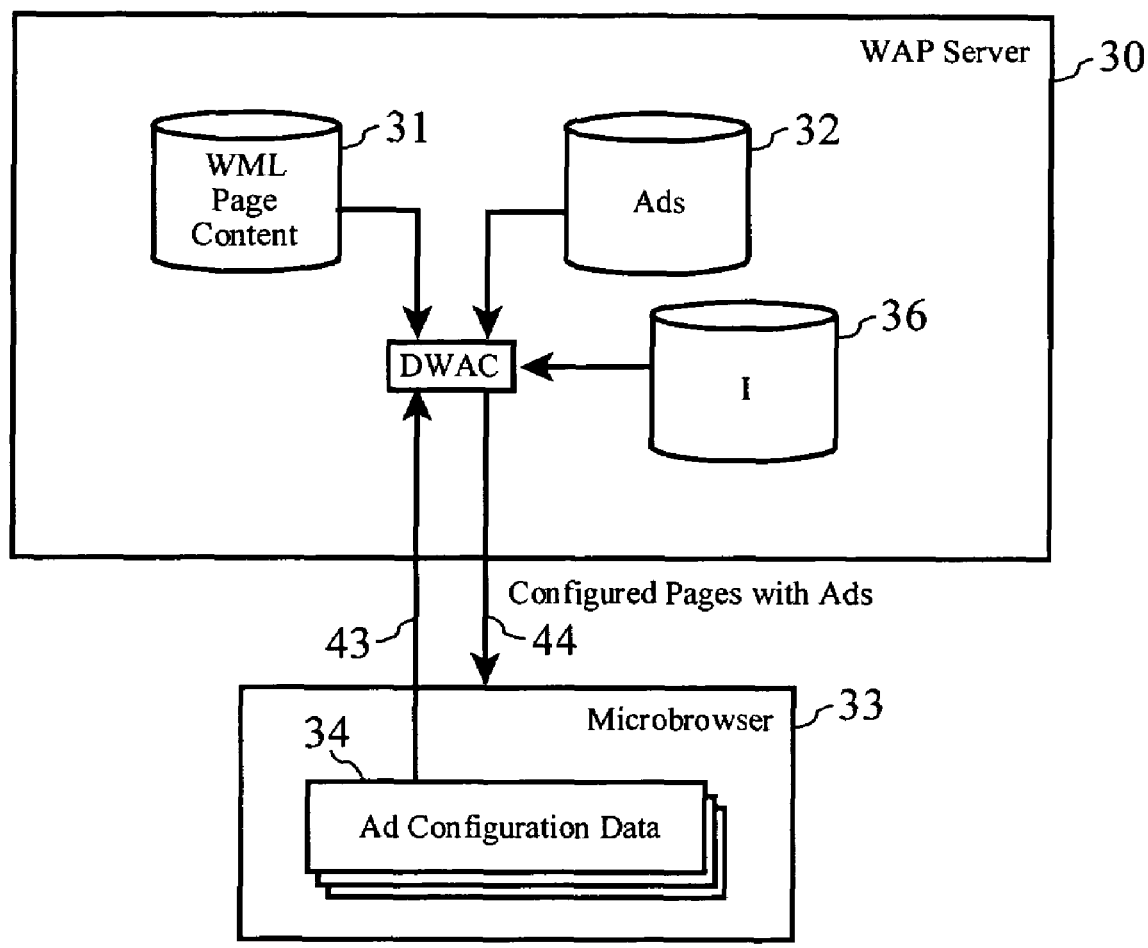
FIG. 3 graphically discloses the general arrangement and cooperation of the components of the preferred embodiment relative to a server and a microbrowser.

Turning to FIG. 3, the invention's logical process and component arrangement is shown. First, a microbrowser device (33) is provided with an advertisement configuration (34) data set which can be interrogated by a server. This Advertisement Configuration Data set (34) (ACD) may include a plurality of user-defined limitations, such as a maximum download time (per object and/or per page), maximum display area (per object and/or per page), number of permitted colors, amount of memory allowed, and preferences based upon states of the microbrowser such as battery condition (AC powered, battery full, battery low, etc.), wireless connection mode (digital, analog, home network, roaming, etc.), display backlight mode (on or off), etc.

Two sets of conditions are provided according to the preferred embodiment—one for normal battery conditions, and the other set for low battery conditions. A third set for AC-powered conditions may also be provided. Table 1 shows an example ad configuration data set which could be stored in a plain text file on a microbrowser.

TABLE 1

Example Ad Configuration Data Set when AC_powered:
    max_memory_per_object = 8k
    max_load_time_per_page = 30 sec
    animation = allowed
    colors = full
    max_screen_area = 400%
    scripts = allowed
when low_battery:
    max_memory_per_object = 2k
    max_load_time_per_page= 10 sec
    animation = disallowed
    colors = 2
    max_screen_area = 100%
    scripts = disallowed
when normal_battery:
    max_memory_per_object = 4k
    max_load_time_per_page= 20 sec
    animation = disallowed
    colors = full
    max_screen_area = 100%
    scripts = allowed In this example, the user has configured the microbrowser to run scripts only when the unit is AC powered or when the battery is not low, and the user has restricted objects from downloading which use more than 2 colors when the battery is low. Anytime the unit is battery powered, the user has restricted the downloading of animated objects, and has progressively restricted the size the download time for objects based on battery conditions. However, when the unit is AC powered, the user has configured an allowance for a maximum display area to go beyond a single screen or display area, which would require scrolling to view.

In another embodiment, the ACD may be stored on the microbrowser as a cookie. In this case, the server which creates the cookie may allow the user to configure specific limitations for that site only. For example, a user who frequently visits a news service site may be provided with a series of pages in which he or she may specific web object limitations for his or her microbrowser. The news site server would then prepare a cookie containing these limitations, and would store that in the memory of the user's microbrowser. During subsequent visits to the news web site, the cookie could be retrieved in order to observe and follow the user's configured limitations.

Other microbrowser state conditions for which preferences may be set in the ACD can be type of wireless connection (digital, analog, home network, roaming, etc.), display light conditions (display backlight enabled or disabled), muting, etc. For example, advertisements and objects which require lengthy download times may be blocked when the wireless connection mode is "roaming" to avoid unnecessary connection costs.

Continuing with the discussion of FIG. 3, the server for the microbrowser (30) is provided with two sets of conventional web objects, a first of which is a web of normal WML page content objects (31). The second set is a set of advertisement objects (32), which may also be encoded in a suitable format such as WML, graphics interchange format (GIF), joint photographics experts graphics (JPEG), audio (WAV), video (AVI), or other type of web encoding (MPEG, MP3, PDF, etc.) Each of the objects in the advertisement set (32) and preferably in the page content set (31) are also indexed as to their resource requirements such as number of colors required, animation or still, display area, transmission size/time, and whether or not they are or include a script. According to the preferred embodiment, this information is stored in a separate index or database I (36) in order to avoid the need to modify these standard objects. The index I (36) may be built and populated manually, or preferably, by an analysis tool which generates these associated characteristics.

Finally, the server (30) is provided with a Dynamic Wireless Advertisement Configurator (35) (DWAC) program, which in response to a generic page request from the microbrowser (33), receives the ad configuration data set (34) from the microbrowser, determines which, if any, of the objects within the requested page fit within the configured limitations using the index I (36), and retrieves those objects (31, 32) for transmission to the microbrowser (33). The DWAC program is preferably realized as a Java servlet, but may alternately be realized in other programming languages and methodologies without departing from the scope of the invention.

Figure 4:
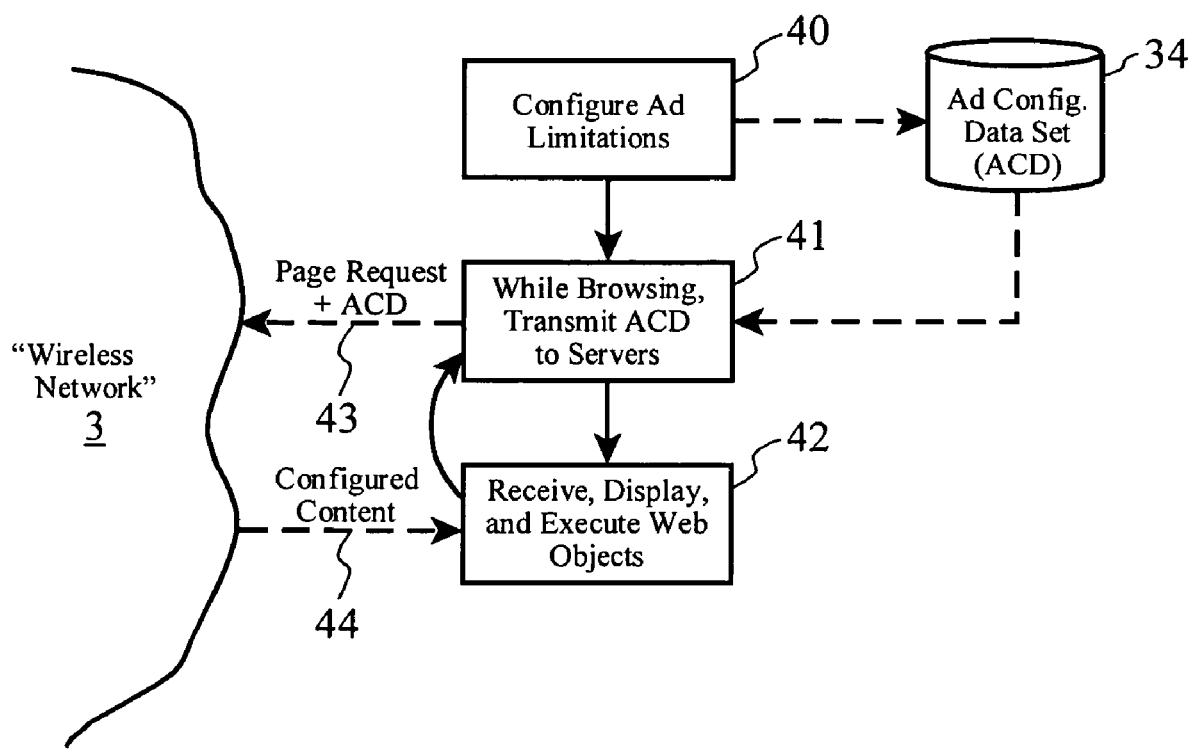
FIG. 4 shows the logical process of the invention as performed by a microbrowser.

Turning to FIG. 4, the logical process followed by the microbrowser unit is shown in more detail. This process may be realized as an enhancement to the resident microbrowser code, or as a downloadable component such as a script or a microbrowser plug-in. First, the microbrowser is configured (40) to include an Ad Configuration Data set (34), or ACD, which is stored in memory such as non-volatile Flash or on a microdrive.

Then, while browsing the "wireless web" (3), the ACD is transmitted (41) in association with page requests (43). This may be accomplished in two ways. First, the page request may be enhanced to include the ACD information, such that it is always included with the page request. Or, it may be transmitted only upon request from a server. The second method is more easily implemented, as it does not require a modification to the WAP protocol, and only require the server's servlet to interact with the code enhancements on the microbrowser.

Further according to the preferred embodiment, the microbrowser selects which ACD or portion of its ACD to sent based upon present conditions such as the battery or AC power conditions, system clock, etc.

After the server has selected the appropriate web objects which meet the constraints of the supplied ACD, the microbrowser receives, displays and otherwise executes (42) the configured page content (44).

Figure 5:
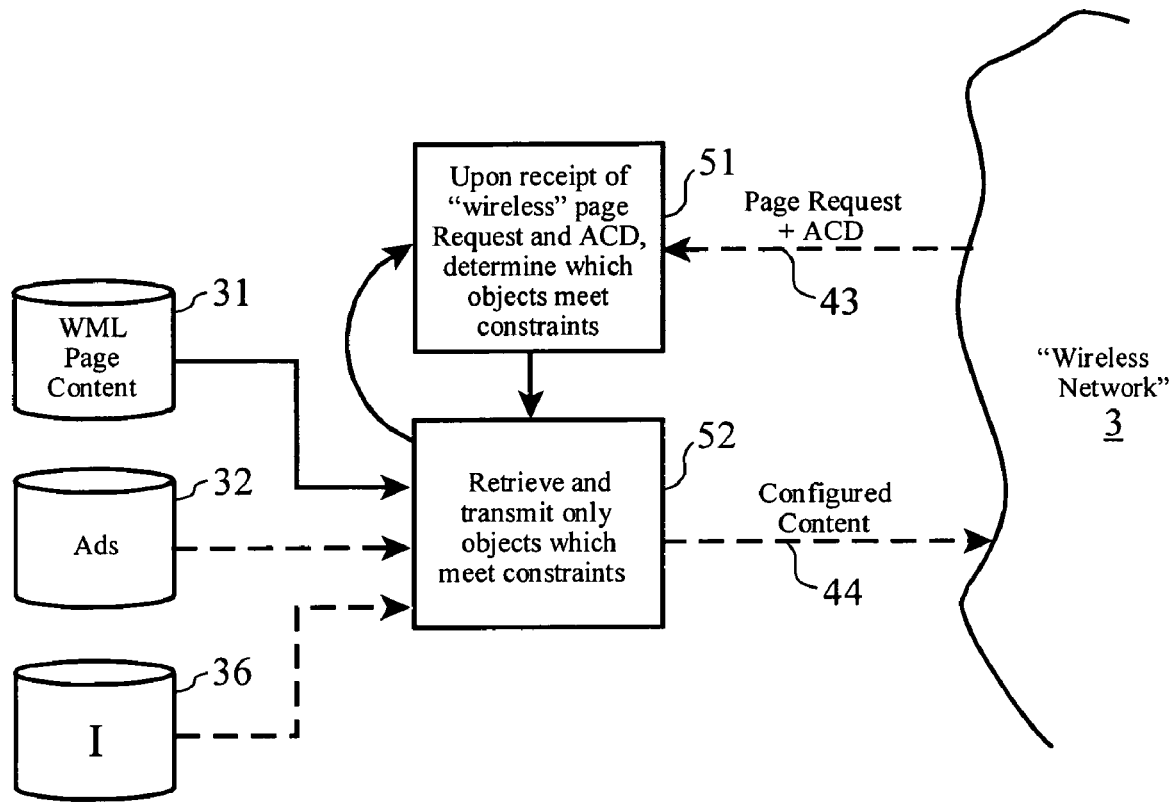
FIG. 5 shows the logical process of the invention as performed by a server.

Turning to FIG. 5, the corresponding and cooperating server logical process is shown in more detail. Preferably, this process is realized in a Java servlet, but may alternately be realized as a script or code change to a WML or other wireless application server software package.

When a page request is received via a wireless network (3), an ACD is also received or requested (51) (see previous description of FIG. 4). The index I (36) is consulted to determine which, if any, of the objects contained in the requested page meet the constraints set forth in the ACD (52), which are then transmitted as configured content (44) via the wireless web (3) to the requesting microbrowser.

As will be readily understood by those skilled in the art, the present invention may be utilized with "wired" microbrowsers, as well, such as Internet appliances and WebTV units. Anywhere and anytime browser resources are limited, the present invention may be useful in allowing the user to configure the allowed and disallowed web content to be downloaded. For example, the invention could be used to allow older personal computers which have limited resources (monochrome displays, limited memory and processor capabilities, slow modem, etc.) to continue to be useful as web browsers.

As such, the use of terms such as "wireless", "wireless web", specific protocols such as WAP, and specific web object formats such as WML should not be seen as limitations to the scope of the invention, but rather are facets of the preferred embodiment. Therefore, the scope of the present invention should be determined by the following claims.

What is claimed is:

1. A method comprising the steps of:
   receiving by a server a page request sent from a battery-powered microbrowser while said microbrowser is performing online browsing, said page having a plurality of web objects stored by said server;
   receiving by said server from said microbrowser a data set associated with said page request, said data set containing a plurality of user-defined download limitations, and said data set being selected by said microbrowser from a plurality of data sets disposed in said microbrowser according to a battery power condition of said microbrowser;
   selecting by said server at least one web object of said page having characteristics which meet said user-defined download limitations; and
   transmitting by said server to said microbrowser said selected web object while blocking download of web objects which do not meet said download limitations.

2. The method as set forth in claim 1 wherein said step of selecting web objects comprises consulting an index of web object characteristics.

3. The method as set forth in claim 1 wherein said step of receiving a data set comprises receiving a limitation indication selected from the group of a maximum transmission time, a maximum number of display colors, a maximum display area, a maximum memory consumption, a restriction on executable code, a restriction on animated images, battery condition indication, and network connection mode.

4. The method as set forth in claim 1 wherein said step of blocking download of web objects comprises blocking download of advertisement web objects.

5. A method comprising the steps of:
   disposing in a battery-powered microbrowser a plurality of data sets, each data set containing a plurality of user-defined download limitations;
   sending a page request from said microbrowser to a server while said microbrowser is performing online browsing, said page having a plurality of web objects stored by said server;
   selecting by said microbrowser a data set according to a battery power condition of said microbrowser;
   sending from said microbrowser to said server said selected data set in association with said page request;
   receiving by said microbrowser a set of web objects from said server, said received web objects being selected by said server for having characteristics which meet download limitations according to said selected data set, said server blocking download of web objects within said requested page which do not meet said download limitations; and
   displaying, playing, or executing said received web objects by said microbrowser.

6. The method as set forth in claim 5 wherein said step of sending a data set comprises sending a limitation indication selected from the group of a maximum transmission time, a maximum number of display colors, a maximum display area, a maximum memory consumption, a restriction on executable code, a restriction on animated images, battery condition indication and network connection mode.

7. The method as set forth in claim 5 wherein said step of sending a data set comprises sending a cookie to a server.

8. The method as set forth in claim 5 wherein said step of receiving server-selected web objects comprises blocking download of advertisement web objects.

* * * * *